United States Patent
Sackett et al.

(10) Patent No.: US 9,064,166 B2
(45) Date of Patent: Jun. 23, 2015

(54) OPTIMIZING FOCUS PLANE POSITION OF IMAGING SCANNER

(71) Applicant: SYMBOL TECHNOLOGIES, INC., Schaumburg, IL (US)

(72) Inventors: Willam C Sackett, East Setauket, NY (US); Christopher W Brock, Manorville, NY (US); David P Goren, Smithtown, NY (US)

(73) Assignee: Symbol Technologies, LLC, Holtsville, NY (US)

( * ) Notice: Subject to any disclaimer, the term of this patent is extended or adjusted under 35 U.S.C. 154(b) by 0 days.

(21) Appl. No.: 14/090,700

(22) Filed: Nov. 26, 2013

(65) Prior Publication Data
US 2015/0144699 A1    May 28, 2015

(51) Int. Cl.
  *G06K 7/10* (2006.01)
(52) U.S. Cl.
  CPC .................................. *G06K 7/10831* (2013.01)
(58) Field of Classification Search
  CPC ................................................ G06K 7/10831
  USPC .................... 235/375, 435, 436, 454, 462.11, 235/462.24, 462.41
  See application file for complete search history.

(56) References Cited

U.S. PATENT DOCUMENTS

| 7,611,060 B2* | 11/2009 | Wang et al. ............. 235/462.23 |
| 2008/0219655 A1 | 9/2008 | Yoon et al. |
| 2010/0231782 A1 | 9/2010 | Okamoto et al. |
| 2011/0220719 A1 | 9/2011 | Ogawa et al. |
| 2012/0182461 A1 | 7/2012 | Pease et al. |
| 2012/0212607 A1 | 8/2012 | Yoshida |
| 2013/0033623 A1* | 2/2013 | Matsuyama ................ 348/241 |

OTHER PUBLICATIONS

US 8,047,439, 11/2011, Wang et al. (withdrawn)

* cited by examiner

*Primary Examiner* — Kristy A Haupt
(74) *Attorney, Agent, or Firm* — Nong-Qiang Fan

(57) ABSTRACT

A method includes the following: (1) projecting a light pattern towards a target object; (2) detecting light returned from the target object through an imaging lens arrangement with an imaging sensor to capture a first image with changes in the position of the focus plane of the imaging lens arrangement; (3) processing the first image to determine an optimized position of the focus plane of the imaging lens arrangement; (4) detecting light returned from the target object with the imaging sensor to capture a second image when the position of the focus plane of the imaging lens arrangement is maintained at the optimized position; and (5) decoding a barcode in the second image.

16 Claims, 14 Drawing Sheets

ESTIMATING OPTIMAL FOCUS FROM AVAILABLE FOCUS SCORES

OPTIMIZING FOCUS PLANE POSITION OF IMAGING SCANNER

FIELD OF THE DISCLOSURE

The present disclosure relates generally to imaging-based barcode scanners.

RELATED APPLICATIONS

This application is related to U.S. patent application Ser. No. 14/090,883, filed Nov. 16, 2013.

BACKGROUND

Various electro-optical systems have been developed for reading optical indicia, such as barcodes. A barcode is a coded pattern of graphical indicia comprised of a series of bars and spaces of varying widths. In a barcode, the bars and spaces have different light reflecting characteristics. Some of the barcodes have a one-dimensional structure in which bars and spaces are spaced apart in one direction to form a row of patterns. Examples of one-dimensional barcodes include Uniform Product Code (UPC), which is typically used in retail store sales. Some of the barcodes have a two-dimensional structure in which multiple rows of bar and space patterns are vertically stacked to form a single barcode. Examples of two-dimensional barcodes include Code 49 and PDF417.

Systems that use one or more imaging sensors for reading and decoding barcodes are typically referred to as imaging-based barcode readers, imaging scanners, or imaging readers. A imaging sensor generally includes a plurality of photosensitive elements or pixels aligned in one or more arrays. Examples of imaging sensors include charged coupled devices (CCD) or complementary metal oxide semiconductor (CMOS) imaging chips.

BRIEF DESCRIPTION OF THE FIGURES

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

Figure 1:
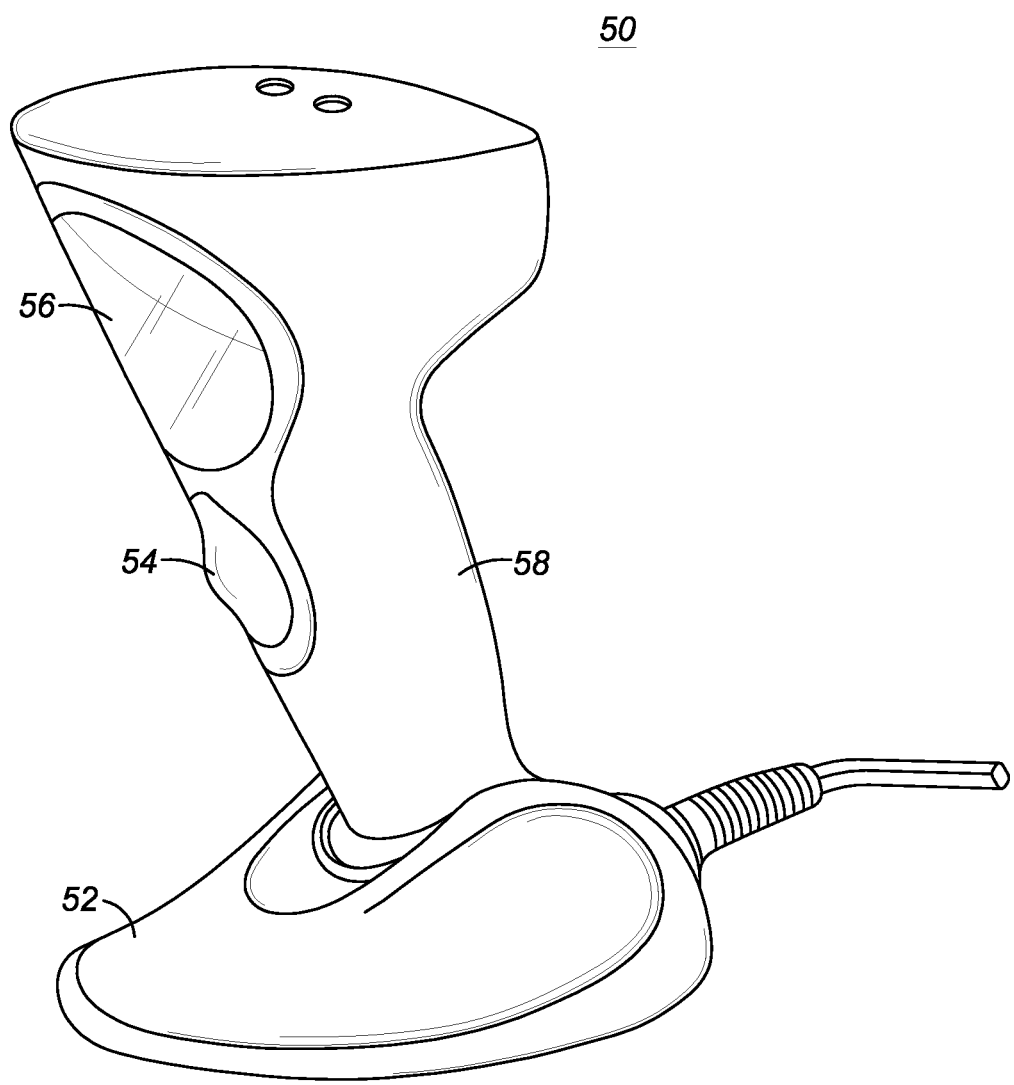
FIG. 1 shows an imaging scanner in accordance with some embodiments.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION

A method includes the following: (1) projecting a light pattern towards a target object; (2) detecting light returned from the target object through an imaging lens arrangement with an imaging sensor to capture a first image during a first frame exposure time period; (3) detecting light returned from the target object through the imaging lens arrangement with the imaging sensor to capture a second image during a second frame exposure time period; and (4) processing an image of a barcode in the second image to decode the barcode. When the first image is captured, the average position of the focus plane of the imaging lens; arrangement during a first row-exposure-time period associated with a first selected row is different from the average position of the focus plane of the imaging lens arrangement during a second row-exposure-time period associated with a second selected row. When the second image is captured, the position of the focus plane of the imaging lens arrangement during at least part of said second frame exposure time period is maintained at an optimized position as determined from processing the first image.

A method includes the following: (1) projecting a light pattern towards a target object; (2) detecting light returned from the target object through an imaging lens arrangement with an imaging sensor to capture at least a first slit-frame-image and a second slit-frame-image; (3) determining an optimized position of the imaging lens arrangement; (4) detecting light returned from the target object through the imaging lens arrangement with the imaging sensor to capture an image of a barcode during a main frame exposure time period, and (5) processing the image of the barcode to decode the barcode. The imaging sensor has rows of photosensitive elements arranged in a matrix. The average position of the focus plane of the imaging lens arrangement during the capture of the first slit-frame-image is different from the average position of the focus plane of the imaging lens arrangement during the capture of the second slit-frame-image. Each of the first slit-frame-image and the second slit-frame-image has pixels located in no more than 32 rows of photosensitive elements in the matrix. In the method, determining the optimized position includes processing at least the first slit-frame-image and the second slit-frame-image. When the image of the barcode is captured, the position of the focus plane of the imaging lens arrangement during at least part of said main frame exposure time period is maintained at the optimized position as previously determined.

FIG. 1 shows an imaging scanner 50 in accordance with some embodiments. The imaging scanner 50 has a window 56 and a housing 58 with a handle. The imaging scanner 50 also has a base 52 for supporting itself on a countertop. The imaging scanner 50 can be used in a hands-free mode as a stationary workstation when it is placed on the countertop. The imaging scanner 50 can also be used in a handheld mode when it is picked up off the countertop and held in an operator's hand. In the hands-free mode, products can be slid, swiped past, or presented to the window 56. In the handheld mode, the imaging scanner 50 can be moved towards a barcode on a product, and a trigger 54 can be manually depressed to initiate imaging of the barcode. In some implementations, the base 52 can be omitted, and the housing 58 can also be in other shapes. In FIG. 1, a cable is also connected to the base 52. In other implementations, when the cable connected to the base 52 is omitted, the imaging scanner 50 can be powered by an on-board battery and it can communicate with a remote host by a wireless link.

Figure 2:
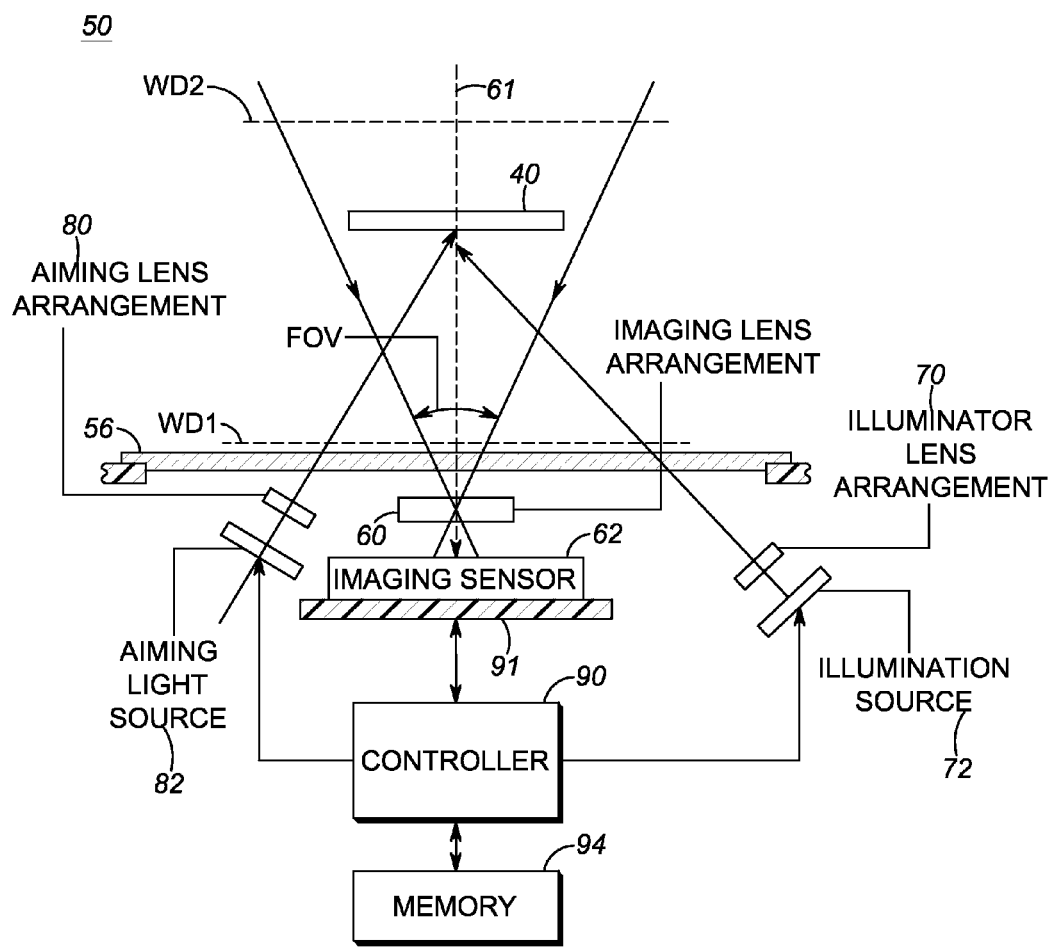
FIG. 2 is a schematic of an imaging scanner in accordance with some embodiments.

FIG. 2 is a schematic of an imaging scanner 50 in accordance with some embodiments. The imaging scanner 50 in FIG. 2 includes the following components: (1) an imaging sensor 62 positioned behind an imaging lens arrangement 60; (2) an illuminating lens arrangement 70 positioned in front of an illumination source 72; (3) an aiming lens arrangement 80 positioned in front of an aiming light source 82; and (4) a controller 90. In FIG. 2, the imaging lens arrangement 60, the illuminating lens arrangement 70, and the aiming lens arrangement 80 are positioned behind the window 56. The imaging sensor 62 is mounted on a printed circuit board 91 in the imaging scanner.

The imaging sensor 62 can be a CCD or a CMOS imaging device. The imaging sensor 62 generally includes multiple pixel elements. These multiple pixel elements can be formed by a one-dimensional array of photosensitive elements arranged linearly in a single row. These multiple pixel elements can also be formed by a two-dimensional array of photosensitive elements arranged in mutually orthogonal rows and columns. The imaging sensor 62 is operative to detect light captured by an imaging lens arrangement 60 along an optical path or axis 61 through the window 56. Generally, the imaging sensor 62 and the imaging lens arrangement 60 are designed to operate together for capturing light scattered or reflected from a barcode 40 as pixel data over a two-dimensional field of view (FOV).

The barcode 40 generally can be located anywhere in a working range of distances between a close-in working distance (WD1) and a far-out working distance (WD2). In one specific implementation, WD1 is in a close proximity to the window 56, and WD2 is about a couple of feet from the window 56. In FIG. 2, the illuminating lens arrangement 70 and the illumination source 72 are designed to operate together for generating an illuminating light towards the barcode 40 during an illumination time period. The illumination source 72 can include one or more light emitting diodes (LED). The illumination source 72 can also include a laser or other kind of light sources. The aiming lens arrangement 80 and the aiming light source 82 are designed to operate together for generating a visible aiming light pattern towards the barcode 40. Such aiming pattern can be used by the operator to accurately aim the imaging scanner at the barcode. The aiming light source 82 can include one or more light emitting diodes (LED). The aiming light source 82 can also include a laser, LED, or other kind of light sources.

In FIG. 2, the controller 90, such as a microprocessor, is operatively connected to the imaging sensor 62, the illumination source 72, and the aiming light source 82 for controlling the operation of these components. The controller 90 can also be used to control other devices in the imaging scanner. The imaging scanner 50 includes a memory 94 that can be accessible by the controller 90 for storing and retrieving data. In many embodiments, the controller 90 also includes a decoder for decoding one or more barcodes that are within the field of view (FOV) of the imaging scanner 50. In some implementations, the barcode 40 can be decoded by digitally processing a captured image of the barcode with a microprocessor.

In operation, in accordance with some embodiments, the controller 90 sends a command signal to energize the illumination source 72 for a predetermined illumination time period. The controller 90 then exposes the imaging sensor 62 to capture an image of the barcode 40. The captured image of the barcode 40 is transferred to the controller 90 as pixel data. Such pixel data is digitally processed by the decoder in the controller 90 to decode the barcode. The information obtained from decoding the barcode 40 is then stored in the memory 94 or sent to other devices for further processing.

Figure 3:
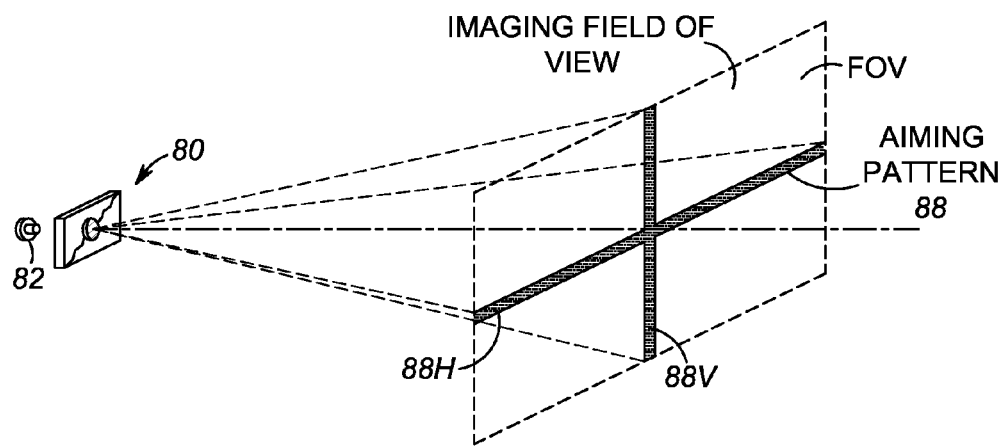
FIG. 3 shows that an aiming pattern is generated within the imaging field of view (FOV) when light from the aiming light source is projected through the aiming pattern generating element in accordance with some embodiments.

Barcode imaging scanners typically project a bright aiming pattern (e.g., a dot, line, cross pattern, etc.) to assist the user in aiming the scanner towards the barcode. When aimed properly, the aiming pattern will be projected onto the desired barcode. As shown in FIG. 3, an aiming pattern 88 can be generated within the imaging field of view (FOV) when the visible light from the aiming light source is projected through the aiming pattern generating element 80. In FIG. 3, the aiming pattern 88 is in the form of an aiming cross-wire that includes two lines of visible illumination: a horizontal line of visible illumination 88H and a vertical line of visible illumination 88V.

Figure 4:
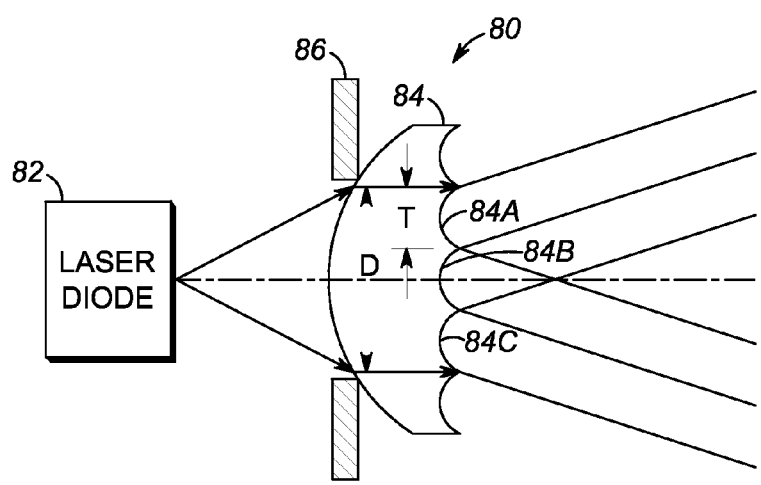
FIG. 4 shows that the aiming pattern generating element can include an aperture stop and an optical component in accordance with some embodiments.

In one implementation, as shown in FIG. 4, the aiming pattern generating element 80 includes an aperture stop 86 and an optical component 84. The optical component 84 in FIG. 4 is a refractive optical element (ROE). Specifically, in one implementation, the rear portion of the optical component 84 is formed with a plurality of refractive structures (e.g., 84A, 84B, 84C, . . . ) for refracting the light beam from the laser diode 82. There are many possible implementations of the optical component 84. Some implementations of the optical component 84—including the implementation as shown in FIG. 4—are described in more detail in U.S. Pat. No. 7,182,260, titled "Aiming light pattern generator in imaging readers for electro-optically reading indicia." In some other embodiments, the optical component 84 in FIG. 4 can also be a diffractive optical element (DOE) that includes a plurality of interferometric elements for generating the aiming pattern by light interference. Some implementations of the diffractive optical element (DOE) are described in more detail in U.S. Pat. No. 6,060,722.

Figure 5:
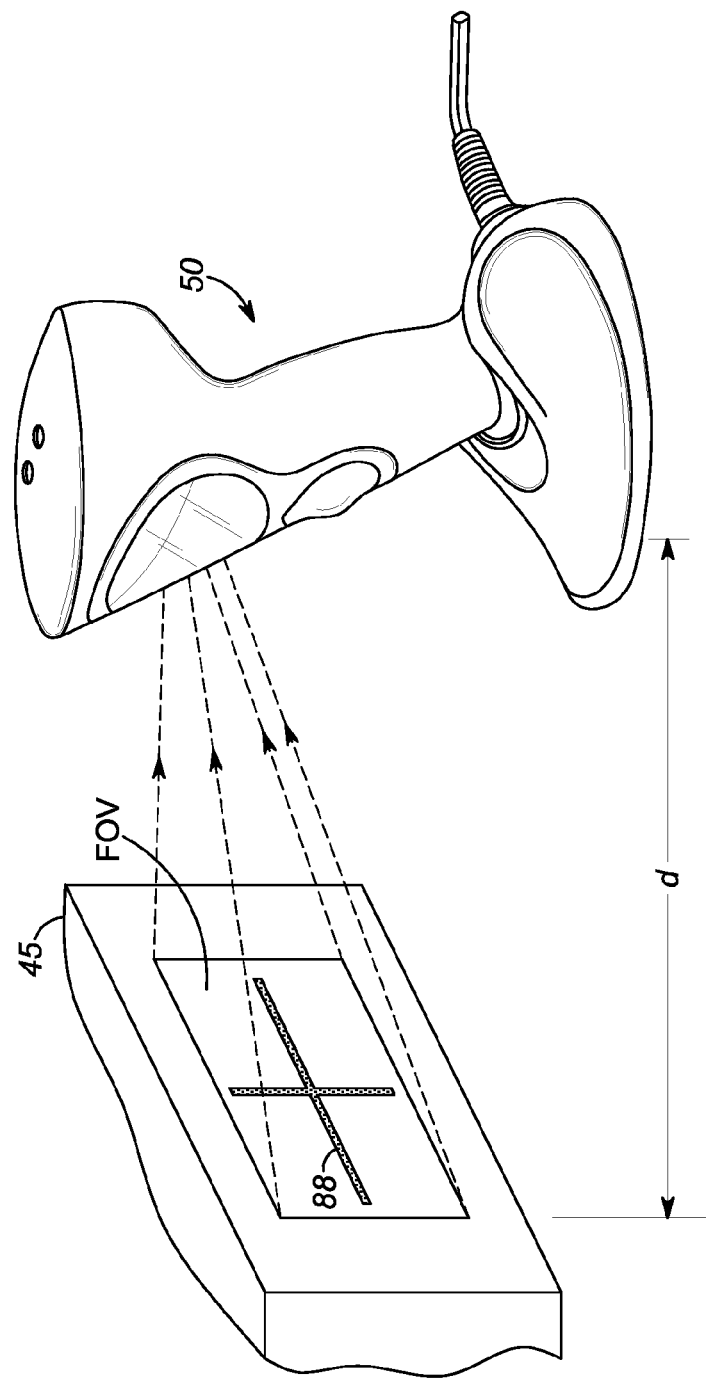
FIG. 5 shows that an image of the aiming pattern is captured by the imaging sensor when the aiming pattern is projected on the surface of a target object.

As shown in FIG. 5, when the aiming pattern 88 is projected on the surface of a target object 45, an image of the aiming pattern 88 can be captured by the imaging sensor 62 to create some pixel data during an exposure time period. In one implementation, the aiming pattern 88 is in the form of an aiming cross wire.

Some of the imaging scanners can include an auto-focus system to enable a barcode be more clearly imaged with the imaging sensor 62 based on the measured distance of this barcode. In some implementations of the auto-focus system, the position of the focus plane of the imaging lens arrangement 60 is adjusted based on the measured distance "d" between the target object 45 and the imaging scanner 50. In some other implementations of the auto-focus system, the sharpness of the image of the aiming cross-wire can be used to determine the position of the focus plane of the imaging lens arrangement.

Auto-focusing in a barcode imaging engine usually requires a series of image frames to be captured in order to set the proper position of the focus plane of the lens system. The process begins by capturing an initial image at one lens position. This image is evaluated and the position of the focus plane of the lens system is adjusted and then a second image is captured. The second image is evaluated and the position of the focus plane of the lens system is adjusted again before another image is captured. This process is repeated until an image with acceptable focus is captured. The process can require many frames and can severely impact the amount of time it takes to obtain a successful barcode decode.

Image sensors are available in two broad varieties: global shutter and rolling shutter. In a global shutter sensor, all rows of the image array are exposed at the same time. This most closely mimics a mechanical shutter type system and is typically the preferred type of sensor, but this functionality comes with a high cost.

In a rolling shutter sensor, the image rows are not exposed at the same time. A rolling shutter sensor captures an image by starting to expose the first image row, then a short time later it starts to expose the second image row, then a short time later it starts to expose the third image row, etc. Although the time of exposure of the first row will overlap with the time of exposure of several subsequent rows, the exposure of the first row will end before some rows have even begun their time of exposure. In this way, capturing an image with a rolling shutter sensor is more like capturing a series of images that are overlapping in time. Although this method of image capture can lead to distortions in fast moving images, rolling shutter sensors are still used because of the their size and cost advantages over global shutter sensors.

Laser aiming systems are used in some imager based barcode scanners to assist the user in positioning the barcode scanner. The laser aiming system projects a pattern (crosshair, box, bright spot, etc.) onto the object being decoded to show the user where the barcode should be positioned. Typically, the aiming pattern is turned off when the image is captured by the sensor.

Figure 6:
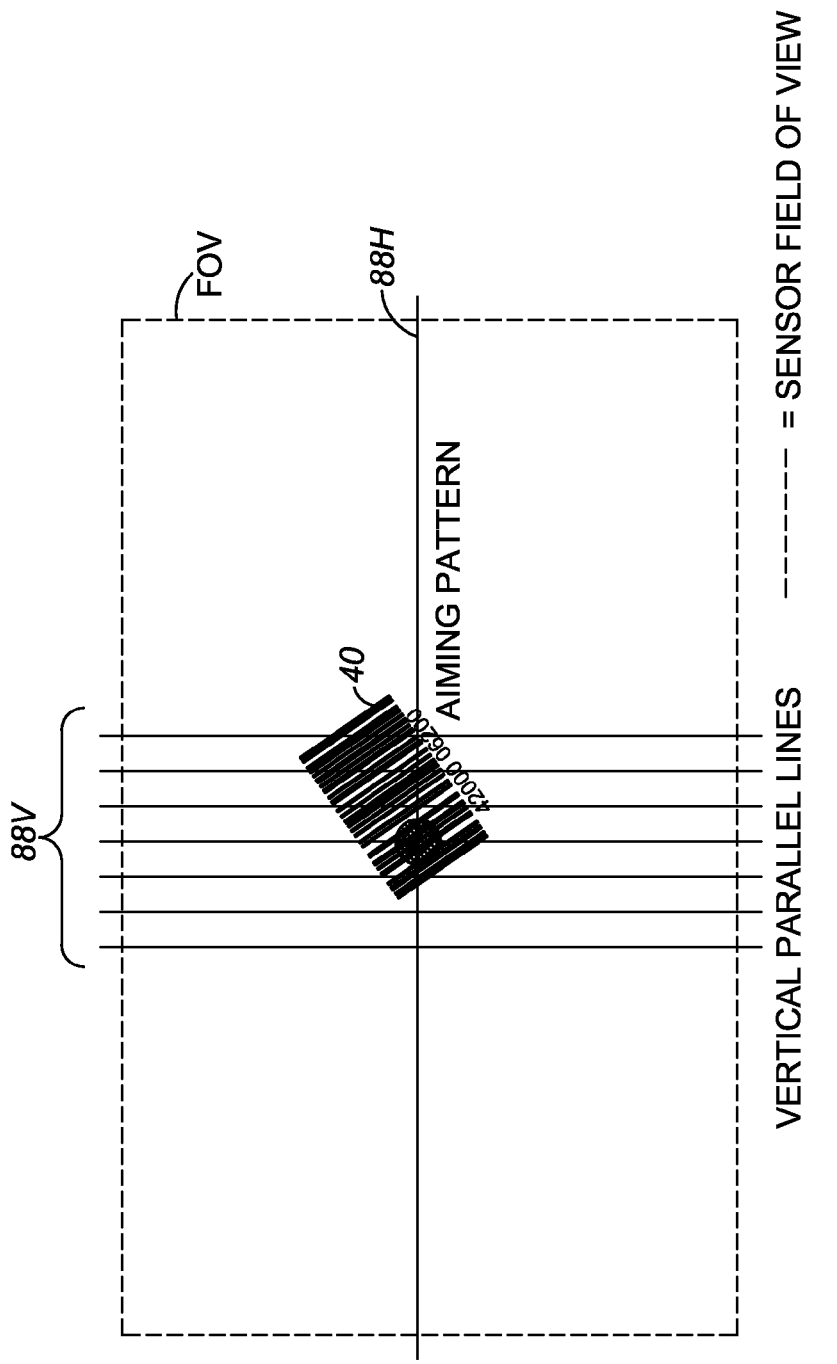
FIG. 6 shows a sample aiming pattern that can be used for quickly finding the proper position of the focus plane in accordance with some embodiments.

In some implementations, the imaging scanner 50 includes both a variable focusing element (such as a motor-controlled mechanical lens assembly or a liquid lens assembly) and a laser aiming system. Such imaging scanner can take advantage of the rolling shutter's staggered exposure operation to provide a method of quickly finding the proper position of the focus plane to successfully decode a barcode image. FIG. 6 shows a sample aiming pattern that can be used for quickly finding the proper position of the focus plane in accordance with some embodiments.

Figure 7:
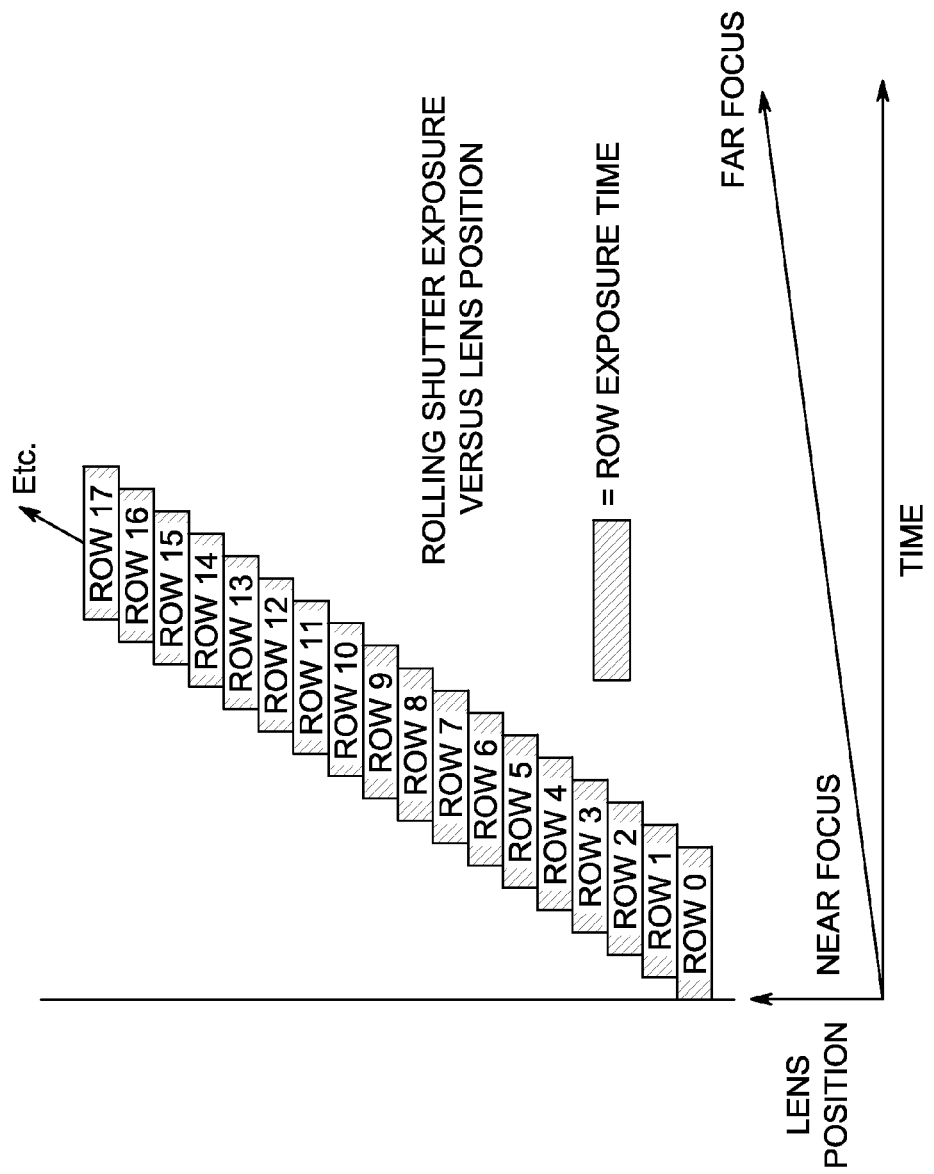
FIG. 7 is a timing diagram showing the exposure of the rows in a rolling shutter mode and the corresponding change of the lens position in accordance with some embodiments.

FIG. 7 is a timing diagram showing the exposure of the rows in a rolling shutter mode and the corresponding change of the lens position in accordance with some embodiments. At the beginning of a scanning session, or at any time that auto-focusing must be performed, the lens of the auto-focus element is set to its nearest focal position and the laser aiming system is activated. The laser aiming pattern is designed in such a way that at least one portion of the aiming pattern contains a series of parallel vertical lines that extend to the top and bottom of the field of view. The image sensor is commanded to acquire an image and it begins to expose the first row of the image; a short time later, it begins to expose the second row of the image; a short time later, it exposes the third line of the image; and so on. While the image sensor rows are being exposed, the auto-focus element is swept from its nearest position of the focus plane to its farthest position of the focus plane by adjusting its control signal (typically a voltage or current setting). The sweep is controlled in such a way that the lens reaches its farthest position of the focus plane approximately when the last rows of the image are being exposed. In this way, each row of the image is exposed with the lens at a different position of the focus plane.

Figure 8:
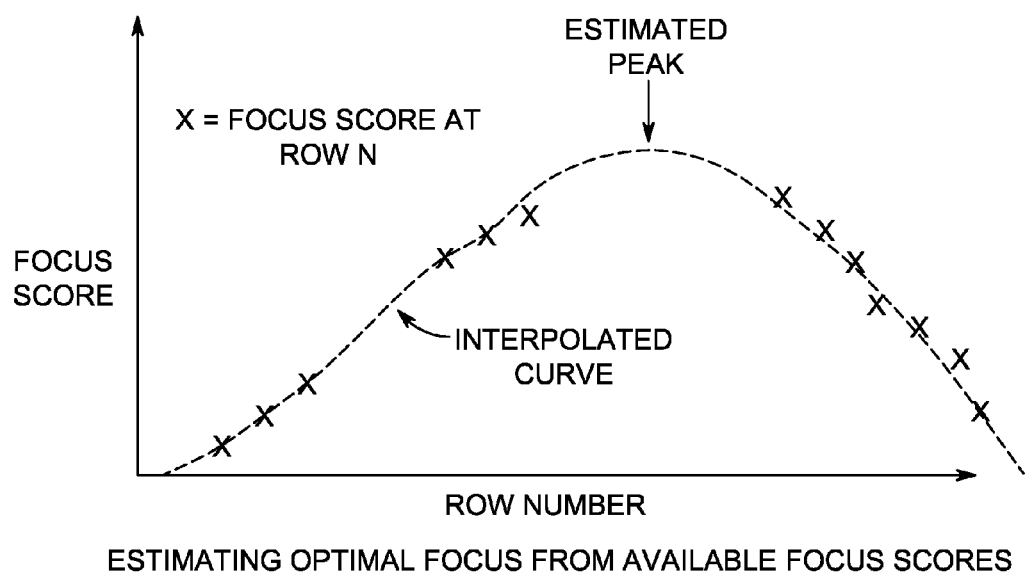
FIG. 8 shows that the estimated peak can be obtained from an interpolated curve in accordance with some embodiments.

When the image capture is complete, software or custom hardware is used to find the vertical aiming lines in each row of the image, and assigns each row a score based upon how well the aiming lines are focused. In one example, FIG. 8 shows the focus score for individual row as a function of the row number in accordance with some embodiments. The row with the highest focus score represents the "optimal" position of the focus plane. The location of this row within the image is then used to estimate the value of the lens control signal when that row was exposed. The lens control signal is then set to this value to move the lens to the "optimal" position of the focus plane. Thus instead of capturing an image, changing the lens position, capturing another image and changing the lens position again, etc., the final position of the focus plane can be found after acquiring only one image.

The method of finding the "optimal" position of the focus plane as described above can have the advantage that it doesn't require any calibration of the lens control system. Prior imaging engines have used the parallax of a laser aiming spot to determine the distance to a barcode; the lens could then be moved to focus at that distance. But such a method requires a closed loop system where the mapping between the lens control signal and the lens position is precisely known. The method of finding the "optimal" position of the focus plane as described above can work with a focusing system that has a wide variability over time, temperature, etc., since the optimal lens control signal value is always estimated from a new image acquired at the current environmental conditions.

Additionally, determining the optimal position of the focus plane of the lens does not require the calculation of a focus score on every line of the image. There will be cases in which the vertical lines that are used for focusing will not be present on some rows or in which they cannot be separated from other elements on those rows. In these cases, the best focusing position can be interpolated from the rows in which a focusing score can be generated by estimating the peak focusing score from the available data. For example, as shown in FIG. 8, the estimated peak can be obtained from an interpolated curve.

Figure 9:
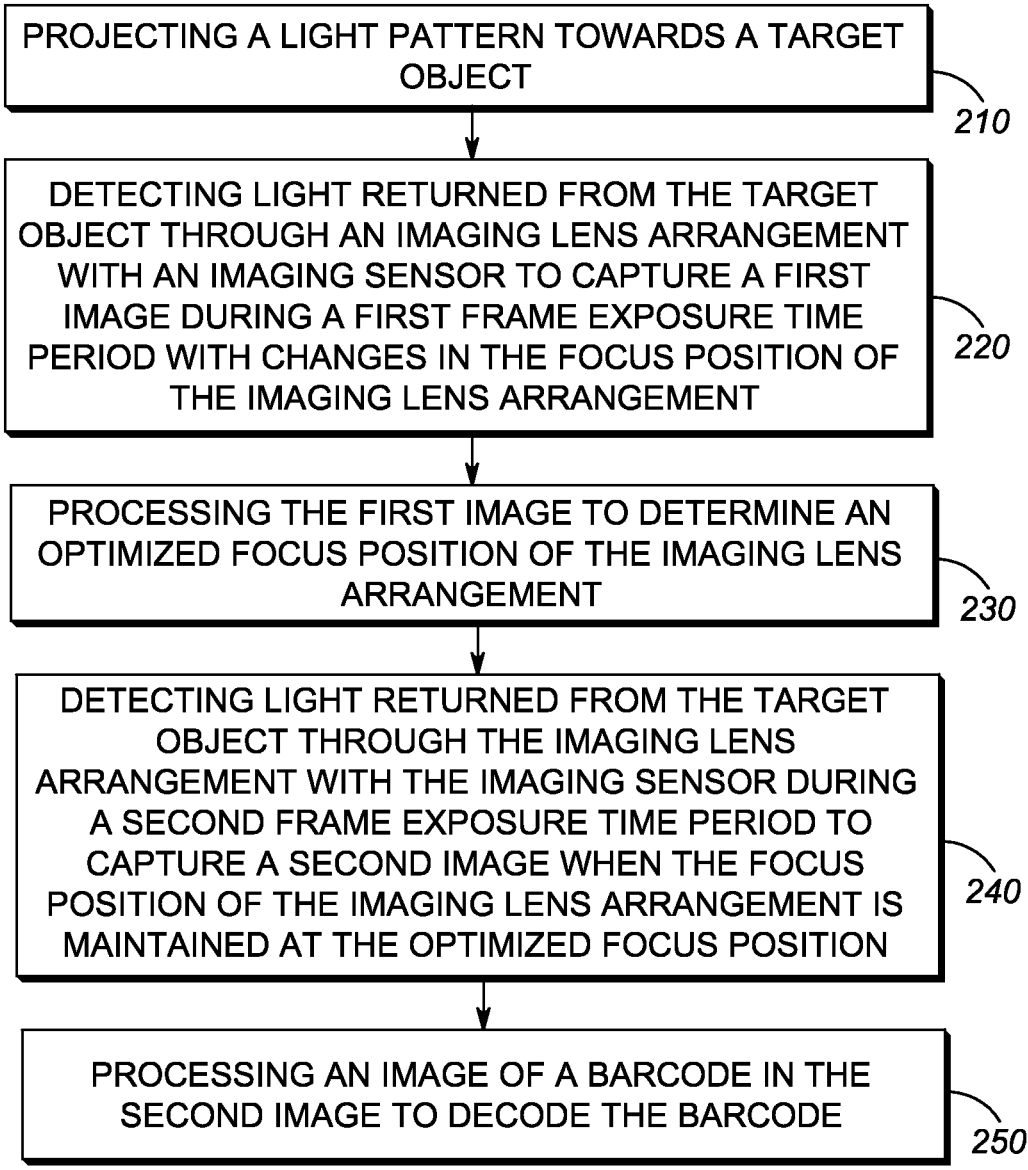
FIG. 9 is a flowchart of a method for finding the proper position of the focus plane to successfully decode a barcode image in accordance with some embodiments.

FIG. 9 is a flowchart of a method 200 for finding the proper position of the focus plane to successfully decode a barcode image in accordance with some embodiments. The method 200 includes block 210, block 220, block 230, block 240, and block 250.

The method 200 can be implemented on an imaging scanner that has an imaging sensor, an imaging lens arrangement, and a light pattern arrangement. The imaging sensor has rows of photosensitive elements arranged in a matrix. The imaging sensor is configured to capture an image from a target object during a frame exposure time period. In the imaging sensor, each row of photosensitive elements is associated with a corresponding row exposure time period. The imaging lens arrangement configured to operate together with the imaging sensor for detecting light from the target object within a field of view. The light pattern arrangement is configured to generate a light pattern projected towards the target object. The imaging sensor can operate in rolling shutter mode. When operating in rolling shutter mode, each given row of photosensitive elements is associated with a corresponding row exposure time period during which the amount of light impinging upon on each photosensitive element in the given row is converted into electrical signal. In rolling shutter mode, the frame exposure time covers the row exposure time periods for all rows in the imaging sensor.

In the method 200 of FIG. 9, at block 210, a light pattern is projected towards a target object. At block 220, light returned from the target object is detected through an imaging lens arrangement with an imaging sensor to capture a first image during a first frame exposure time period with changes in the position of the focus plane of the imaging lens arrangement. At block 230, the first image is processed to determine an optimized position of the focus plane of the imaging lens arrangement. At block 240, light returned from the target object is detected through the imaging lens arrangement with the imaging sensor during a second frame exposure time period to capture a second image when the position of the focus plane of the imaging lens arrangement is maintained at the optimized position of the focus plane. At block 250, an image of a barcode in the second image is processed to decode the barcode.

In the method 200 of FIG. 9, at block 210, when a light pattern is projected towards a target object, the light pattern can include at least a first sub-pattern extending in a first direction and a second sub-pattern extending in a second direction that is perpendicular to the first direction. In some implementations, the length of the first sub-pattern along the first direction covers more than 50% of the dimension of an imaging field of view along the first direction, and the length of the second sub-pattern along the second direction covers more than 50% of the dimension of the imaging field of view along the second direction. For example, as shown in FIG. 3 and FIG. 6, the light pattern can be an aiming pattern that includes a first sub-pattern 88V extending in the vertical direction and a second sub-pattern 88H extending the horizontal direction. In the implementations as shown in FIG. 3 and FIG. 6, the length of the first sub-pattern 88V covers 100% of the vertical dimension of the imaging field of view, and the length of the second sub-pattern along 88H covers 100% of the horizontal dimension of the imaging field of view. Furthermore, the first sub-pattern 88V extending in the vertical direction does not have to be continuous, and the first sub-pattern 88V can have gaps (i.e., the vertical pattern lines can appear to be broken lines). The second sub-pattern 88H extending in the horizontal direction also does not have to be continuous.

Figure 10:
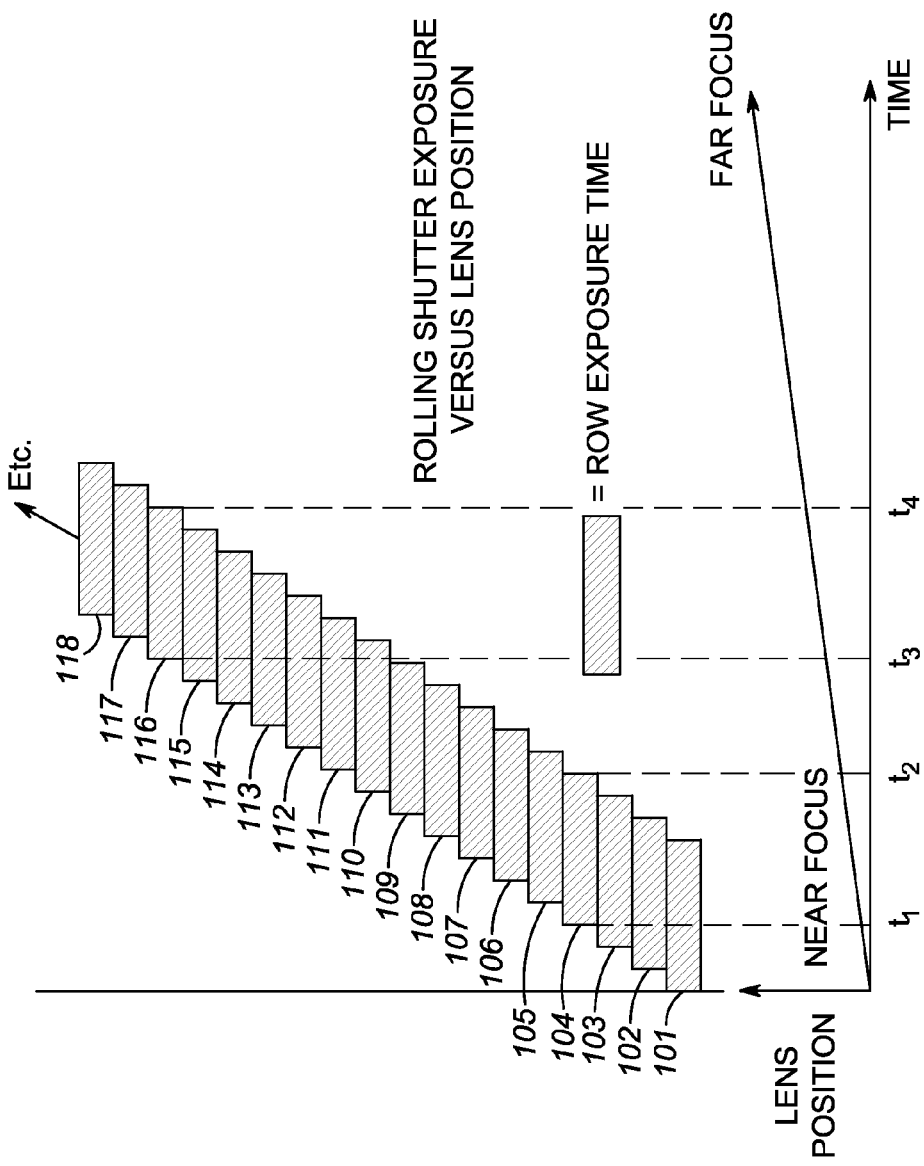
FIG. 10 is a timing diagram showing the exposure of the rows in a rolling shutter mode and the corresponding change of the lens position in accordance with some embodiments.

In the method 200 of FIG. 9, at block 220, when light returned from the target object is detected to capture a first image during a first frame exposure time period, it also involves changes in the position of the focus plane of the imaging lens arrangement. For example, in the implementation as shown in FIG. 10, the position of the focus plane of the imaging lens arrangement increases monotonically during the time period that covers at least all of the row-exposure-time periods for the rows 101-118. In the implementation as shown in FIG. 10, the average position of the focus plane of the imaging lens arrangement during the row-exposure-time period for each one of the rows 101-118 is different from the average position of the focus plane of the imaging lens arrangement during the row-exposure-time period for each other one of the rows 101-118.

In other implementations, the position of the focus plane of the imaging lens arrangement does not have to be changed monotonically. The position of the focus plane of the imaging lens arrangement can be changed in many ways, to make the average position of the focus plane of the imaging lens during a first row-exposure-time period different from the average position of the focus plane of the imaging lens during a second row-exposure-time period. For example, in FIG. 10, the row-exposure-time period for a first selected row 104 is from t1 to t2, and the row-exposure-time period for a second selected row 116 is from t3 to t4; clearly, in FIG. 10, the average position of the focus plane of the imaging lens arrangement during the time from t1 to t2 is different from the average position of the focus plane of the imaging lens arrangement during the time from t3 to t4.

Additionally, in one implementation, the light pattern is projected towards the target object during a time period that covers at least the first row-exposure-time period for the row 104 and the second row-exposure-time period for the row 116. In one example, the light pattern is projected towards the target object at least from time t1 to time t4, and the focus scores for all of the rows 104-116 can be compared at block 230 in FIG. 9. Alternatively, in another example, the light pattern is projected towards the target object at least from time t1 to time t2 and from time t3 to time t4, and the focus scores for at least the row 104 and the row 116 can be compared at block 230 in FIG. 9.

Furthermore, when the light pattern is projected towards the target object, the first image captured by the imaging sensor can include an image generated by the light pattern. In one implementation, such image generated can have pixels located in at least 50% of the rows of photosensitive elements in the matrix. For example, in one implementation, among a total of 1024 rows, the photosensitive elements from the row 200 to the row 824 can includes pixels of the image generated by the light pattern. In some implementation, the image generated by the light pattern can have pixels located in at least 80% of the rows of photosensitive elements in the matrix.

In the method 200 of FIG. 9, at block 230, in some implementations, at least two parts of the first image are compared to determine the position of the focus plane of the imaging lens arrangement during at least part of said second frame exposure time period. The first part of the first image includes pixels captured with photosensitive elements at least in the first selected row, and the second part of the first image includes pixels captured with photosensitive elements at least in the second selected row. For example, the focus score for the row 104 can be compared with the focus score for the row 116 to determine the position of the focus plane. In most implementations, the focus scores of more than two rows are used in an analytical process to determine the position of the focus plane of the imaging lens arrangement. One such example is shown in FIG. 8, in which the optimal position of the focus plane is obtained from an interpolated curve that is based on the data fitting of the focus scores of many rows.

In the method 200 of FIG. 9, at block 240, in one implementation, the second image can be captured in rolling shutter mode during the second frame exposure time period. In another implementation, the second image can be captured in global shutter mode during the second frame exposure time period.

Figure 11:
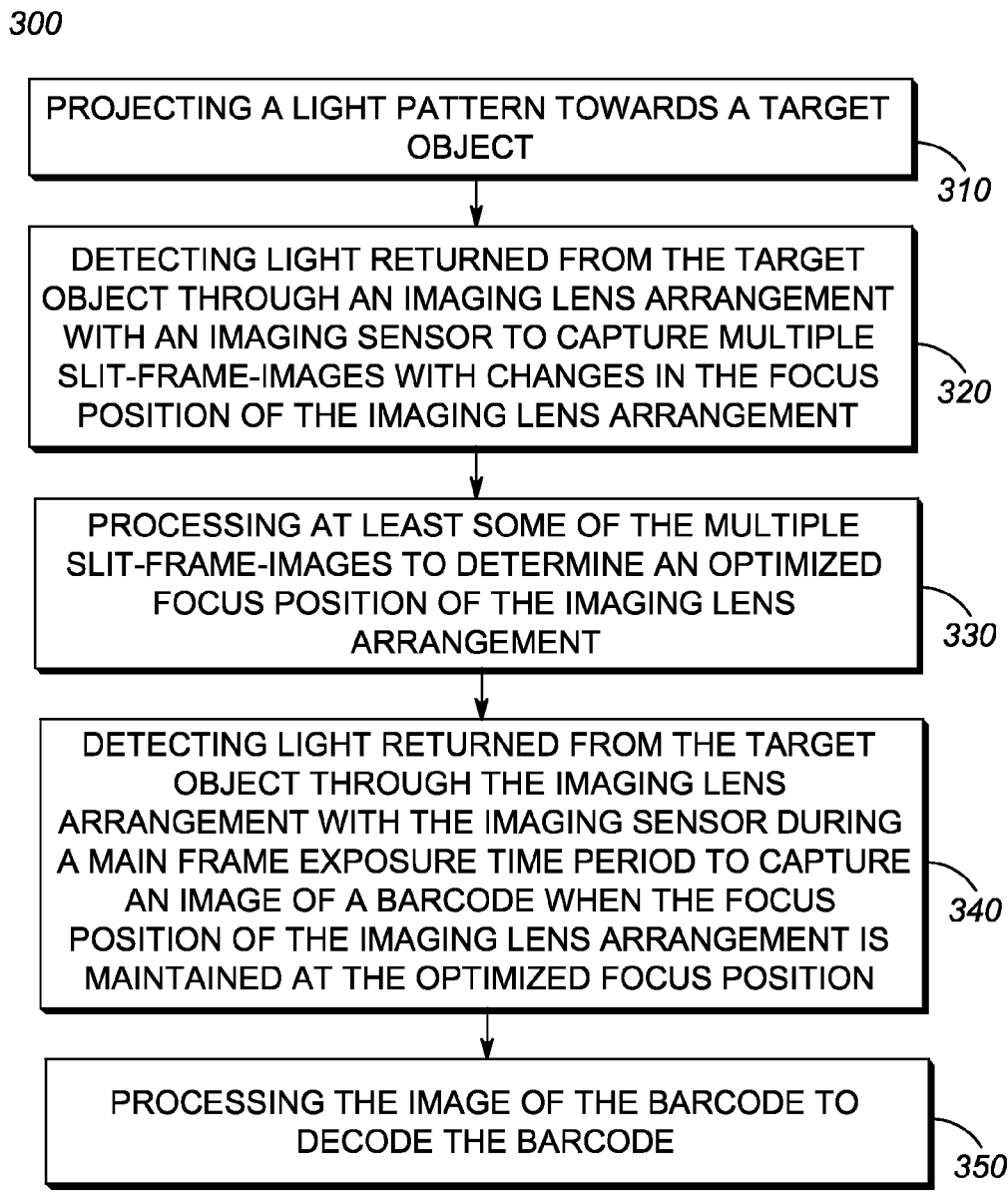
FIG. 11 is a flowchart of an alternative method for finding the proper position of the focus plane to successfully decode a barcode image in accordance with some embodiments.

FIG. 11 is a flowchart of an alternative method 300 for finding the proper position of the focus plane to successfully decode a barcode image in accordance with some embodiments. The method 300 includes block 310, block 320, block 330, block 340, and block 350. In some implementations, the method 300 as shown in FIG. 11 can be implemented with an imaging sensor that supports the mode for capturing slit-frame-images. To capture a slit-frame-image, multiple rows of photosensitive elements are exposed together during the same slit-frame time period. Quite often, these multiple rows constitute only a small fraction of the total number of rows in the imaging sensor, and consequently the pixel values of these multiple rows can be quickly transferred from the imaging sensor to other memories in an ASIC or in another microprocessor. For example, transferring the pixel values from 32 rows of pixel elements can be much faster than transferring the pixel values from all 1024 rows of pixel elements in an example imaging sensor. Because a slit-frame-image can be captured and transferred much quickly than a full frame image, it is possible to rely upon multiple slit-frame-images for quickly finding the proper position of the focus plane of an imaging system.

In the method 300 of FIG. 11, at block 310, a light pattern is projected towards a target object. At block 320, light returned from the target object is detected through an imaging lens arrangement with an imaging sensor to capture multiple slit-frame-images with changes in the position of the focus plane of the imaging lens arrangement. At block 330, at least some of the multiple slit-frame-images are processed to determine au optimized position of the focus plane of the imaging lens arrangement. At block 340, light returned from the target object is detected through the imaging lens arrangement with the imaging sensor during a main frame exposure time period to capture an image of a barcode when the position of the focus plane of the imaging lens arrangement is maintained at the optimized position of the focus plane. In some embodiments, the position of the focus plane of the imaging lens arrangement is maintained at the optimized position of the focus plane during at least part of the main frame exposure time period. At block 350, the image of the barcode is processed to decode the barcode.

In the method 300 of FIG. 11, at block 320, when the multiple slit-frame-images are captured, each of the multiple slit-frame-images generally have pixels located in no more than 32 rows of photosensitive elements. Depending upon specific implementations, a slit-frame-image can have anywhere between one row to thirty-two rows of pixels. For example, a slit-frame-image can have 32 rows of pixels, 16 rows of pixels, 8 rows of pixels, 4 rows of pixels, 2 rows of pixels, or a single row of pixels.

In some embodiments of the method 300, at block 330, the determination of the optimized position of the imaging lens arrangement can include processing at least some of the multiple slit-frame-images. In some embodiments, the focus sharpness of at least some of the multiple slit-frame-images are compared to determine the optimized position of the focus plane. In some embodiments, given a subgroup of the multiple slit-frame-images, the average position of the focus plane of the imaging lens arrangement during the capture of each one of the slit-frame-images in the subgroup has a value different from the average position of the focus plane of the imaging lens arrangement during the capture of each other one of the slit-frame-images in the subgroup.

In some embodiments of the method 300, at block 320, at least a first slit-frame-image and a second slit-frame-image are captured. Furthermore, at block 330, the determination of the optimized position of the imaging lens arrangement can include processing at least the first slit-frame-image and the second slit-frame-image. For example, the determination of the optimized position can include comparing the focus sharpness of the first slit-frame-image with the focus sharpness of the second slit-frame-image.

Figure 12A:
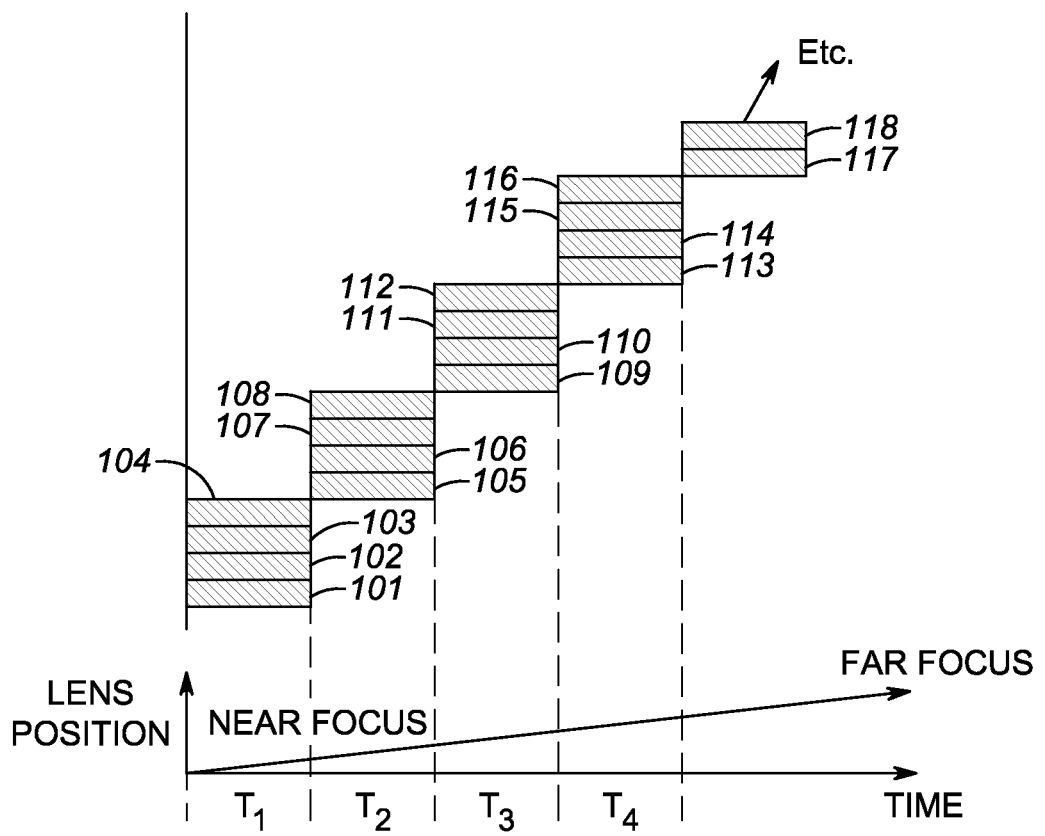
FIGS. 12A-12B are timing diagrams each showing the capture of slit-frame-images and the corresponding change of the lens position in accordance with some embodiments.
Figure 12B:
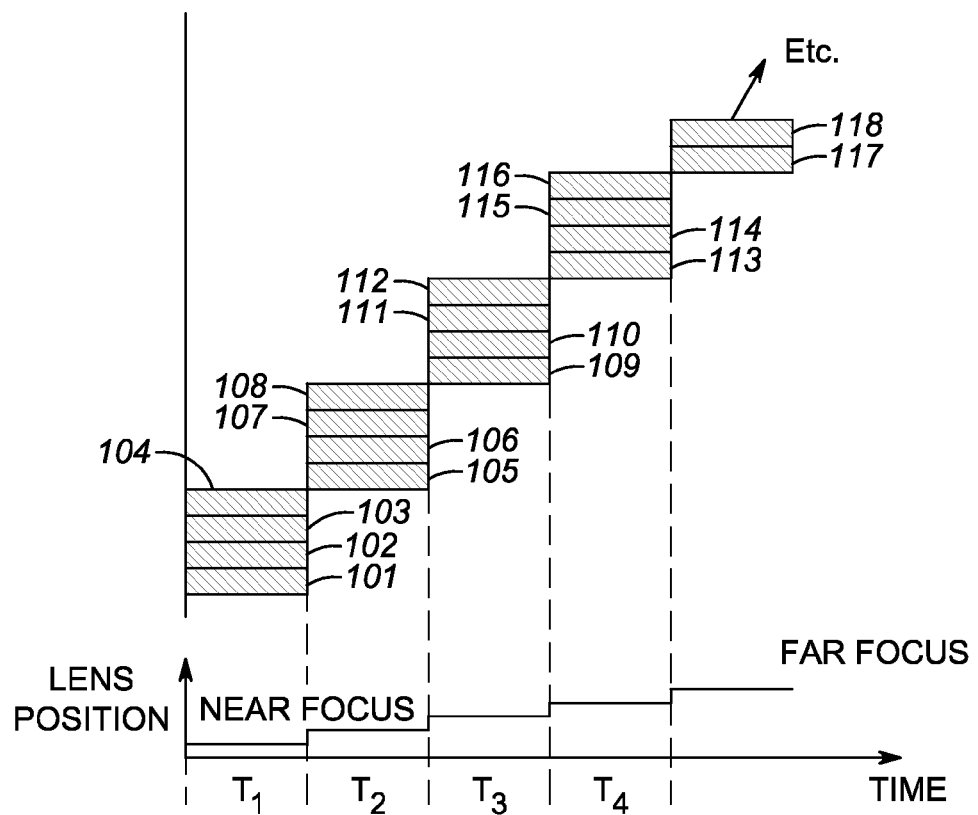

FIGS. 12A-12B are timing diagrams each showing the capture of slit-frame-images and the corresponding change of the lens position in accordance with some embodiments. In the example as shown in FIGS. 12A-12B, multiple slit-frame-images are captured during slit-frame time period $T_1$, $T_2$, $T_3$, $T_4$, etc. The slit-frame-image captured during slit-frame time period $T_1$ are composed from the pixels in rows 101, 102, 103, and 104. The slit-frame-image captured during slit-frame time period $T_2$ are composed from the pixels in rows 105, 106, 107, and 108. The slit-frame-image captured during slit-frame time period $T_3$ are composed from the pixels in rows 109, 110, 111, and 112. The slit-frame-image captured during slit-frame time period $T_4$ are composed from the pixels in rows 113, 114, 115, and 116. In FIG. 12A, while the multiple slit-frame-images are captured during slit-frame time period $T_1$, $T_2$, $T_3$, and $T_4$, the position of the focus plane of the imaging lens arrangement are monotonically increased. In FIG. 12B, the position of the focus plane of the imaging lens arrangement is essentially maintained at constant during the capture of each of the multiple slit-frame-images as shown in the figure, but the position of the focus plane for each of the multiple slit-frame-images captured during $T_1$, $T_2$, $T_3$, and $T_4$ are increased monotonically.

Figure 13A:
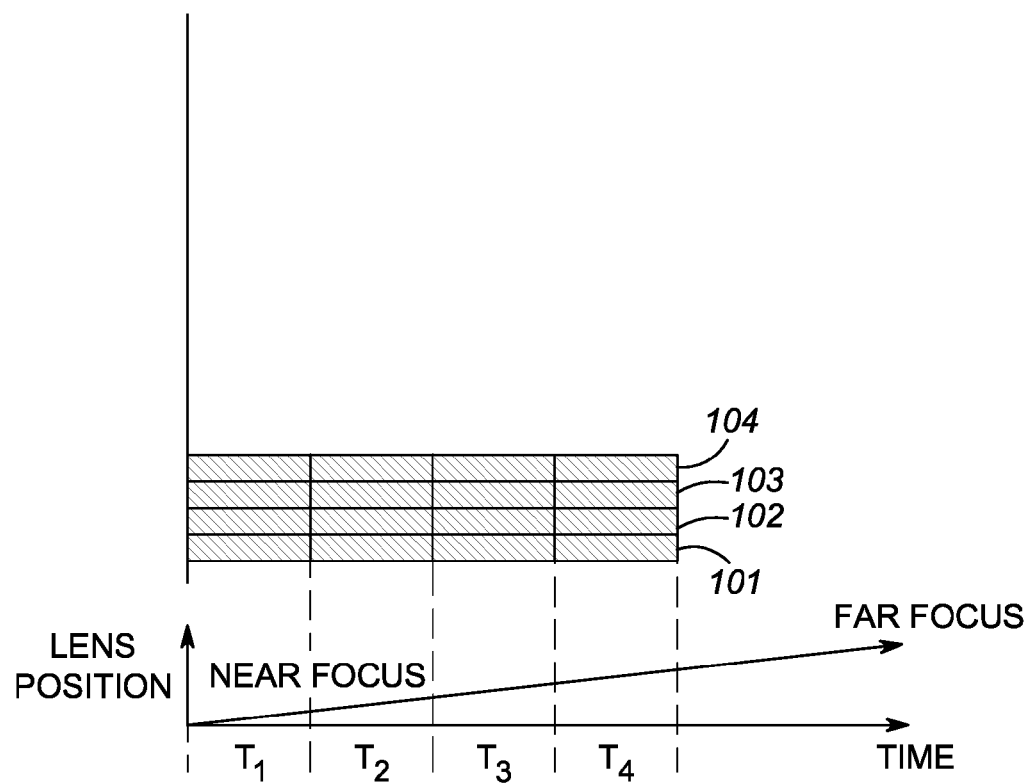
FIGS. 13A-13B are timing diagrams each showing, in another implementation, the capture of slit-frame-images and the corresponding change of the lens position in accordance with some embodiments.
Figure 13B:
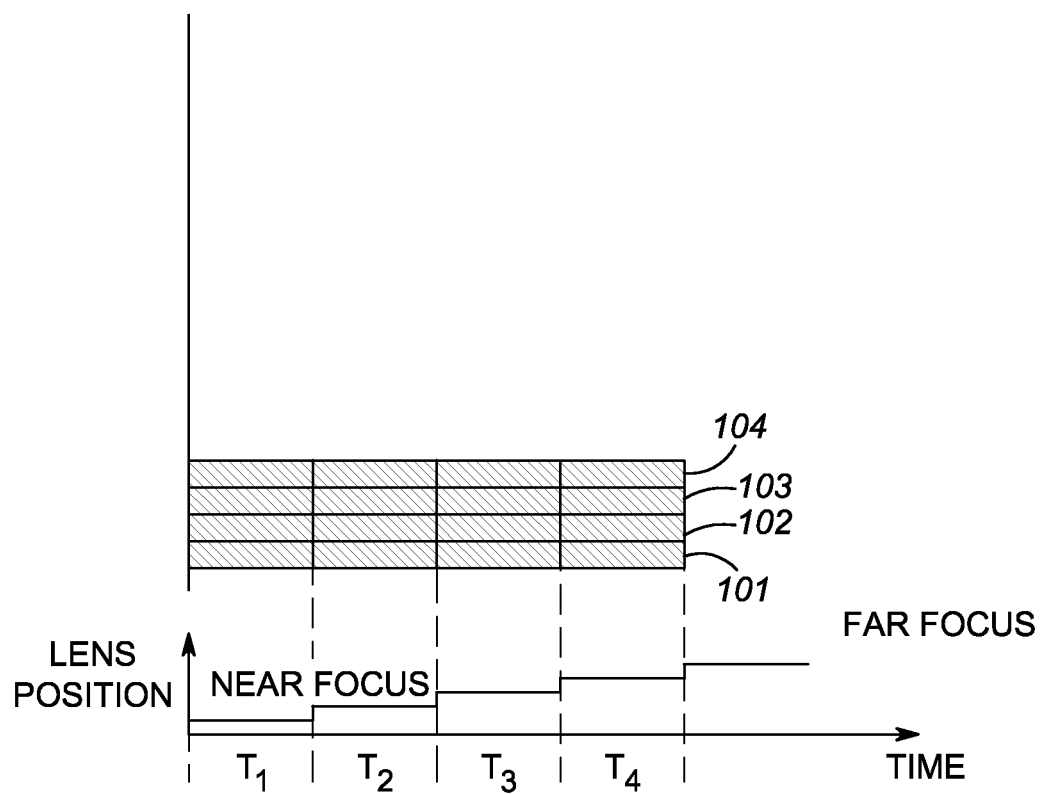

In general, depend on the implementation, the position of the focus plane for each of the multiple slit-frame-images captured sequentially can increase monotonically, decrease monotonically, or change in other more complicated ways. Additionally, in alternative embodiments as shown in FIG. 13A-13B, the multiple slit-frame-images captured during slit-frame time period T1, T2, T3, and T4 can be all from the same group of rows (e.g., all from rows 101, 102, 103, and 104). In still some other embodiments, some multiple slit-frame-images can be from the same group of rows, but some other multiple slit-frame-images can be from the different group of rows. Furthermore, in the embodiment as shown in FIG. 12A-12B, each of the multiple slit-frame-images captured includes 4 rows of pixels, but in other embodiments, the multiple slit-frame-images captured do not all have the same number of rows (e.g., some may have 3 rows while some others may have 5 rows).

In FIGS. 12A-12B and FIGS. 13A-13B, after the capture of the multiple slit-frame-images, the focus sharpness of these multiple slit-frame-images can be compared to determine the optimized position of the imaging lens arrangement. Once such optimized position is determined, during the next frame exposure time period, an image of a barcode can be captured when the position of the focus plane of the imaging lens arrangement is maintained at the optimized position of the focus plane. Thereafter, the image of the barcode is processed to decode this captured barcode.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

It will be appreciated that some embodiments may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g., comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

What is claimed is:

1. A method comprising:
projecting a light pattern towards a target object;
detecting light returned from the target object through an imaging lens arrangement with an imaging sensor to capture a first image during a first frame exposure time period, the imaging sensor having rows of photosensitive elements arranged in a matrix wherein each row of photosensitive elements is associated with a corresponding row-exposure-time period, and wherein the average position of the focus plane of the imaging lens arrangement during a first row-exposure-time period associated with a first selected row is different from the average position of the focus plane of the imaging lens arrangement during a second row-exposure-time period associated with a second selected row, with both the first row-exposure-time period and the second row-exposure-time period allocated within said first frame exposure time period;
detecting light returned from the target object through the imaging lens arrangement with the imaging sensor to capture a second image during a second frame exposure time period, wherein the position of the focus plane of the imaging lens arrangement during at least part of said second frame exposure time period is maintained at an optimized position as determined from processing the first image;
processing an image of a barcode in the second image to decode the barcode;
comparing a first part of the first image with a second part of the first image to determine the position of the focus plane of the imaging lens arrangement during at least part of said second frame exposure time period; and
wherein the first part of the first image includes pixels captured with photosensitive elements at least in the first selected row, and the second part of the first image includes pixels captured with photosensitive elements at least in the second selected row.

2. The method of claim 1, further comprising:
projecting a light pattern towards the target object during a time period that covers at least the first row-exposure-time period and the second row-exposure-time period.

3. The method of claim 1, further comprising:
changing the position of the focus plane of the imaging lens arrangement at least during a part of said first frame exposure time period.

4. The method of claim 1, further comprising:
changing the position of the focus plane of the imaging lens arrangement monotonically during a time period that covers at least the first row-exposure-time period and the second row-exposure-time period.

5. The method of claim 1, wherein:
the first image captured by the imaging sensor includes an image generated by the light pattern, with the image generated having pixels located in at least 50% of the rows of photosensitive elements in the matrix.

6. The method of claim 1, wherein:
the first image captured by the imaging sensor includes an image generated by the light pattern, with the image generated having pixels located in at least 80% of the rows of photosensitive elements in the matrix.

7. The method of claim 1, wherein said detecting light returned from the target object comprises:
capturing the second image in rolling shutter mode during the second frame exposure time period.

8. The method of claim 1, wherein said detecting light returned from the target object comprises:
capturing the second image in global shutter mode during the second frame exposure time period.

9. A method comprising:
projecting a light pattern towards a target object;
detecting light returned from the target object through an imaging lens arrangement with an imaging sensor to capture a first image during a first frame exposure time period, the imaging sensor having rows of photosensitive elements arranged in a matrix wherein each row of photosensitive elements is associated with a corresponding row-exposure-time period, and wherein the average position of the focus plane of the imaging lens arrangement during a first row-exposure-time period associated with a first selected row is different from the average position of the focus plane of the imaging lens arrangement during a second row-exposure-time period associated with a second selected row, with both the first row-exposure-time period and the second row-exposure-time period allocated within said first frame exposure time period;
detecting light returned from the target object through the imaging lens arrangement with the imaging sensor to capture a second image during a second frame exposure time period, wherein the position of the focus plane of the imaging lens arrangement during at least part of said second frame exposure time period is maintained at an optimized position as determined from processing the first image;
processing an image of a barcode in the second image to decode the barcode; and
projecting a light pattern towards the target object during a time period that covers at least the first row-exposure-time period and the second row-exposure-time period, wherein the light pattern includes at least a first sub-pattern extending in a first direction and a second sub-pattern extending in a second direction that is perpendicular to the first direction, wherein the length of the first sub-pattern along the first direction covers more than 50% of the dimension of an imaging field of view along the first direction, and wherein the length of the second sub-pattern along the second direction covers more than 50% of the dimension of the imaging field of view along the second direction.

10. An apparatus comprising:
an imaging sensor having rows of photosensitive elements arranged in a matrix, the imaging sensor being configured to capture an image from a target object during a frame exposure time period wherein each row of photosensitive elements is associated with a corresponding row exposure time period;
an imaging lens arrangement configured to operate together with the imaging sensor for detecting light from the target object within a field of view;
a light pattern arrangement configured to generate a light pattern projected towards the target object;
a controller operative to change the position of the focus plane of the imaging lens arrangement during at least a fraction of a first frame exposure time period when a first image is captured with the imaging sensor, to process the first image to determine an optimized position of the focus plane of the imaging lens arrangement, and to cause the imaging sensor to capture a second image during a second frame exposure time period when the position of the focus plane of the imaging lens arrangement during at least part of said second frame exposure time period is maintained at the optimized position as determined from processing the first image; and
the first part of the first image includes pixels captured with photosensitive elements at least in a first selected row, and the second part of the first image includes pixels captured with photosensitive elements at least in a second selected row.

11. The apparatus of claim 10, wherein:
the controller is operative to process an image of a barcode in the second image to decode the barcode.

12. The apparatus of claim 10, wherein the controller is operative to change the position of the focus plane of the imaging lens arrangement during a time period that covers at least a first row-exposure-time period and a second row-exposure-time period within the first frame exposure time period.

13. The apparatus of claim 10, wherein the controller is operative to change the position of the focus plane of the imaging lens arrangement monotonically during a time period that covers at least a first row-exposure-time period and a second row-exposure-time period within the first frame exposure time period.

14. The apparatus of claim 10, wherein:
the first image captured by the imaging sensor includes an image generated by the light pattern with the image generated having pixels located in at least 50% of the rows of photosensitive elements in the matrix.

15. The apparatus of claim 10, wherein:
the first image captured by the imaging sensor includes an image generated by the light pattern with the image generated having pixels located in at least 80% of the rows of photosensitive elements in the matrix.

16. The apparatus of claim 10, wherein the controller is operative to compare a first part of the first image with a second part of the first image to determine the position of the focus plane of the imaging lens arrangement during at least part of said second frame exposure time period.

* * * * *